United States Patent

Pfiffner

[15] 3,646,361

[45] Feb. 29, 1972

[54] HIGH-SPEED SAMPLE AND HOLD SIGNAL LEVEL COMPARATOR

[72] Inventor: Harold J. Pfiffner, Los Angeles, Calif.

[73] Assignee: Hughes Aircraft Company, Culver City, Calif.

[22] Filed: Oct. 16, 1970

[21] Appl. No.: 81,235

[52] U.S. Cl. ...............................307/235, 307/289, 328/151

[51] Int. Cl. .......................................................H03k 5/00

[58] Field of Search ..................307/235, 289, 290; 328/150, 328/151

[56] References Cited

UNITED STATES PATENTS

| | | | |
|---|---|---|---|
| 3,375,501 | 3/1968 | McCutcheon et al | 328/151 X |
| 3,469,112 | 9/1969 | Hands et al. | 328/151 X |
| 3,548,221 | 12/1970 | Hintz | 307/289 X |
| 3,551,697 | 12/1970 | Candy | 307/289 X |

*Primary Examiner*—John Zazworsky

*Attorney*—James K. Haskell and Robert Thompson

[57] ABSTRACT

A sample and hold comparator fabricated with emitter coupled logic using only one transistor-type, resistors, and interconnects and including a differential comparator and logic circuit for comparing an input signal $V_{IN}$ with a reference signal $V_{REF}$ in response to a short duration sample and hold pulse $V_{S/H}$ to produce a digital ONE or ZERO output signal depending upon whether the compared input signal is above or below the reference signal. The differential comparator and logic circuit being further responsive to a regenerative feedback signal produced by a differential amplifier in response to the output signal for latching or holding the state of the sample and hold comparator at the comparison state so that it is not further responsive to variations in the input signal $V_{IN}$ until after a reset pulse $V_{RESET}$ is received by it for clearing the sample and hold comparator circuitry.

18 Claims, 3 Drawing Figures

INVENTOR.
HAROLD J. PFIFFNER,
BY
Robert Thompson
ATTORNEY

HIGH-SPEED SAMPLE AND HOLD SIGNAL LEVEL COMPARATOR

BACKGROUND OF THE INVENTION

This invention relates generally to logic circuitry and relates more particularly to a sample and hold signal level comparator of a type which can, for example, be utilized in analog-to-digital converters and other circuits.

There is a need for sample and hold comparator circuits having small sampling aperture times so that high speed operation can be attained. Heretofore, sample, hold, and reset operations have been accomplished with combinations of a plurality of circuit components. For example, a separate sample and hold circuit has been utilized for sampling the instantaneous magnitude of an input signal voltage and temporarily holding this sampled value. A standard comparator amplifier sensed the relative magnitude of the temporarily held sampled signal with respect to a reference voltage level and subsequently generated a logical ONE or ZERO output depending upon whether the sampled value of the input signal was greater than or less than the compared reference signal. Thereafter, an output memory flip-flop stored and detected ONE or ZERO signal until required for subsequent use.

The objectives of a sample and hold comparator having small sampling apertures and high operating speed can be attained with the provision of a comparator and switching logic which compares the voltage of an input signal with a reference signal and which has high speed switching capabilities in response to input signals such as reset pulses, sample and hold pulses, and latching capabilities in response to a regenerative feedback signal. A preferred embodiment is featured by emitter coupled logic gates preferably fabricated from NPN-transistors, resistors, and interconnect lines and which transistors are operable in their active regions below saturation. Advantages of the regenerative feedback is that it enhances switching speed and signal sensitivity as a result of a short signal propagation path within the sample and hold comparator between the input $V_{IN}$ and the output of a feedback amplifier. In addition, the embodiment has the advantage of being capable of fabrication on a single wafer by integrated circuit techniques since all of the transistors are of the same type and the only passive elements are resistors and interconnect lines. Furthermore, the circuit has the advantage of temperature compensation since the transistors have emitter-base voltage matches having low temperature coefficients whereupon changes in temperature affect all transistors the same since the transistors temperature track equally, especially when the circuit is fabricated on a single wafer. Consequently, there is a reduced need for precision in the voltage levels of the sample and hold pulses and reset pulses. Furthermore, the circuit is capable of improving the speed of operation in analog-to-digital converters and eliminates the need for separate sample and hold circuits, comparator circuits, and output memory circuits.

BRIEF DESCRIPTION OF THE DRAWINGS

Other objectives, features, and advantages of this invention will become apparent upon reading the following detailed description and referring to the accompanying drawings wherein:

FIG. 2 is a timing chart graphically illustrating the waveforms of the reset pulse $V_{RESET}$ and the sample and hold pulse $V_{S/H}$ relative to each other and the minimum level of input signal $V_{IN}$ that the circuit of FIG. 1 will operate on.

DESCRIPTION OF THE PREFERRED EMBODIMENT

Figure 1:
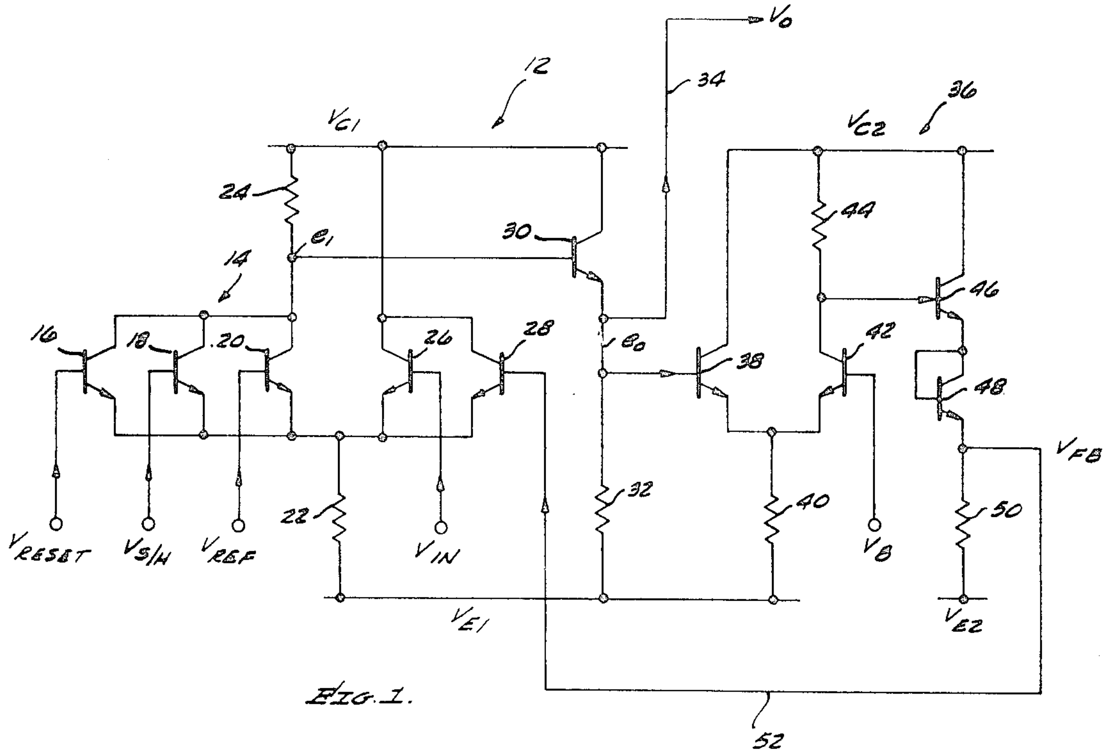
FIG. 1 is a schematic circuit diagram of the sample and hold comparator including: a comparator and switching logic that receives an input signal $V_{IN}$, a reference signal $V_{REF}$, a sample and hold pulse $V_{S/H}$, a reset pulse $V_{RESET}$, and a feedback signal $V_{FB}$; a buffer amplifier for producing a digital output signal $V_O$; and a feedback amplifier responsive to the output signal for producing a regenerative feedback signal $V_{FB}$ which latches the circuit in its compared condition.

The sample and hold comparator 12 illustrated in FIG. 1 compares the voltage magnitude of an input signal $V_{IN}$ with the voltage magnitude of a reference voltage $V_{REF}$ during the duration of a sample and hold pulse $V_{S/H}$ (FIG. 2) to produce a positive voltage level output signal $V_O$ which has been arbitrarily designated as a digital ONE when the magnitude of input voltage $V_{IN}$ exceeds the reference voltage $V_{REF}$ magnitude and to provide a relatively negative voltage output signal $V_O$ which is arbitrarily designated as a digital ZERO when the input voltage $V_{IN}$ is less than the reference voltage $V_{REF}$.

Hereinafter when a pulse voltage signal or a voltage level is referred to as being high, or going high, this should be understood as being high relative to the signal's more negative voltage state. Conversely, when the pulse signal or signal level is referred to as being low or going low, this is now relative to its more positive voltage level. Furthermore, when signal levels are referred to this is intended to, refer to voltage levels unless otherwise stated.

As will be explained in more detail, the state of the output signal $V_O$ is used by the sample and hold comparator 12 to produce a regenerative feedback signal $V_{FB}$ that latches the output signal state $V_O$ so that the sample and hold comparator 12 is not further responsive to variations in the input signal $V_{IN}$ until a high reset pulse $V_{RESET}$ is subsequently received. The reset pulse $V_{RESET}$ resets the sample and hold comparator's circuitry to an initial condition before any new voltage level magnitude comparisons can be made between the input signal $V_{IN}$ and the reference voltage $V_{REF}$.

Figure 2:
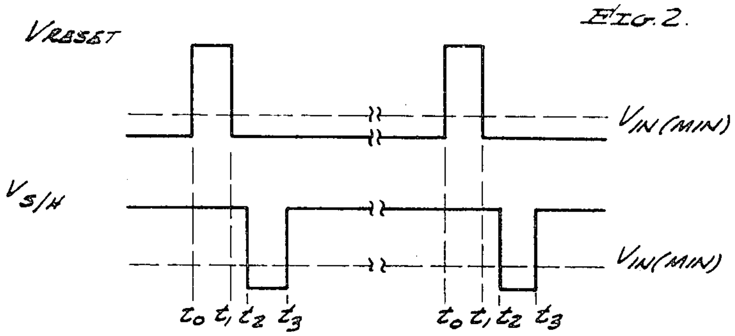
Figure 3:
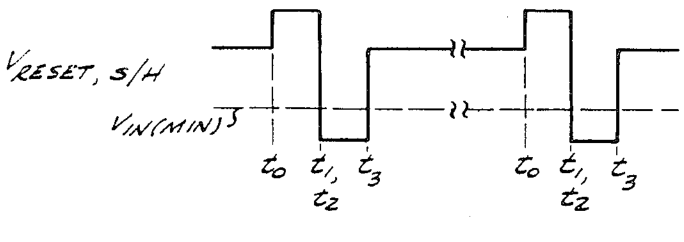
FIG. 3 is another embodiment of input signal waveform illustrated as a three level combined reset, sample, and hold pulse.

More specifically, the sample and hold comparator 12 is cleared and reset between the times $t_0$ and $t_1$ in response to a reset pulse $V_{RESET}$ graphically illustrated in FIG. 2. For example, at time $t_0$ the leading edge of the high reset pulse $V_{RESET}$ which can, for example, be 1 to 2 nanoseconds in duration is received at one input terminal of a comparator and switching logic circuit 14 which produces an output signal $e_1$ related to the relative voltage magnitudes between the input signal $V_{IN}$ and the reference signal $V_{REF}$. The level of this output signal $e_1$ controls the state of the output signal $V_O$ in response to a sample and hold pulse $V_{S/H}$, holds the state of the output signal $V_O$ in response to the feedback signal $V_{FB}$, and clears the sample and hold comparators circuitry to produce the low output $V_O$ in response to the reset signal $V_{RESET}$. It should be pointed out that the most positive voltage level of these four input signals' waveforms applied to the comparator and switching logic 14 are related to each other in the following manner: $V_{RESET} > V_{FB} > V_{S/H} > V_{IN}$; $V_{RESET} > V_{FB} > V_{S/H} > V_{REF}$; and $V_{REF}$ is within full range of $V_{IN}$. As will be explained, the signal having the most positive voltage level at any instant of time dominates the comparator and switching logic circuit 14 by overriding all other input signals.

Assuming that the input signal $V_{IN}$ has a voltage magnitude less than the reference voltage $V_{REF}$, the sample and hold comparator 12 is reset between the times $t_0$ and $t_1$ by a reset pulse $V_{RESET}$ applied to the base terminal of an emitter coupled logic transistor 16 to turn NPN transistor 16 on. Coupled in parallel circuit relationship with the emitter coupled logic transistor 16 are emitter coupled logic NPN-transistors 18 and 20 in a first circuit branch. The emitter terminals of these three NPN-transistors are coupled to one end of a common emitter resistor 22 which operates as a current source and which has the other end coupled to a DC emitter voltage $V_{E1}$. The collector terminals of these transistors are coupled to one end of a common collector resistor 24 which has its other end connected to a DC collector voltage $V_{c1}$. The emitter voltage $V_{E1}$ and the collector voltage $V_{C1}$ are selected to operate the transistors in their active regions below saturation in response to the base terminal input signals received by the comparator and switching logic 14. The base terminal of transistor 18 is coupled to receive the sample and hold pulse $V_{S/H}$, and the base terminal of transistor 20 is coupled to receive the reference voltage $V_{REF}$.

In addition, the base terminal of an emitter coupled logic NPN transistor 26 is coupled to receive the input voltage signal $V_{IN}$ which transistor is in turn coupled in parallel circuit relationship with an emitter coupled logic NPN-transistor 28 in a second circuit branch. The base terminal of emitter coupled logic transistor 28 is coupled to receive a feedback voltage $V_{FB}$. The emitter terminal of transistor 28 is coupled in common with the emitter terminal of transistor 26 to one end of the emitter resistor 22, and their collector terminals are coupled in common to the collector voltage $V_{C1}$. As a result, the emitter coupled logic transistor operates as a logical differential comparator amplifier.

Operationally, since the high level of the reset pulse $V_{RESET}$ is more positive than the most positive levels of the sample and hold signal $V_{S/H}$ and the most positive level of the input signal $V_{IN}$ during the time $t_0$–$t_1$, the emitter coupled logic transistor 16 is turned on and all of the other emitter coupled logic transistors 18, 20, 26 and 28 are turned off. The resultant collector current flow through the transistor 16 increases the voltage drop across resistor 24 and results in a drop in the voltage level of the output signal $e_1$ at the junction between one end of the collector resistor 24 and the common collector terminals to its low level. This voltage signal $e_1$ is fed to an emitter follower buffer transistor 30.

The emitter follower buffer transistor 30 is responsive to the output signal $e_1$ from the comparator and switching logic 14 to produce the two state output signal $V_O$ and to drive a feedback amplifier 36. Specifically, the voltage signal $e_1$ is applied to the base terminal of emitter follower buffer transistor 30 which has its collector terminal connected to the collector voltage $V_{C1}$ and its emitter terminal coupled to one end of an emitter follower resistor 32. The other end of resistor 32 is coupled to the emitter voltage $V_{E1}$. Operationally, a decrease in the voltage $e_1$ applied to the base terminal of transistor 30 causes a corresponding decrease in the collector-emitter current conducted therethrough. This decrease in the emitter current causes a corresponding decrease in the voltage drop across emitter resistor 32 whereupon the voltage level $e_o$ at the emitter terminal decreases. The voltage signal $e_o$ at the emitter terminal of transistor 30 is tapped by an output line 34 to provide a low state output signal $V_O$ which is indicative of a digital zero reset condition. In addition, the emitter voltage $e_0$ of transistor 30 is fed to the feedback amplifier 36.

The feedback amplifier 36 is responsive to the emitter voltage $e_o$ from the emitter follower buffer transistor 30 to produce a regenerative feedback signal $V_{FB}$ that is fed to the comparator and switching logic 14. Specifically, the emitter signal is applied to the base terminal of an NPN-transistor 38 that forms one branch of a differential amplifier. The collector terminal of transistor 38 is coupled to a collector voltage $V_{C2}$ and the emitter terminal is coupled to one end of an emitter resistor 40. The other end of emitter resistor 40 is coupled to the emitter voltage $V_{E1}$. Coupled in parallel with the transistor 38 is an NPN-transistor 42 in a second branch which has its emitter terminal coupled to the one end of emitter resistor 40 and its collector terminal coupled to one end of a collector resistor 44 which, in turn, has its other end coupled to the collector voltage $V_{C2}$. The base terminal of voltage amplifying transistor 42 is coupled to receive a DC base bias voltage $V_B$ which is selected to have a voltage level between the most negative voltage of output signal $e_o$ applied to the base terminal of transistor 38 and the most positive voltage of signal $e_o$. Thus, since the voltage of the low signal $e_o$ applied to the base of transistor 38 is more negative than the base bias voltage $V_B$ applied to transistor 42, transistor 38 is turned off and transistor 42 is turned on. The resultant collector current through collector resistor 44 causes an increase in the voltage drop thereacross and a corresponding decrease in the collector voltage.

For amplification, the base terminal of an emitter follower NPN-transistor 46, which operates as a current amplifier, receives the collector voltage signal from the differential amplifier to also decrease current flow from its collector terminal, which is coupled to the collector voltage $V_{C2}$, to the emitter terminal. The emitter terminal of transistor 46 is coupled to a diode connected transistor 48.

To reset the voltage level of the feedback signal $V_{FB}$, diode connected transistor 48 is responsive to the emitter output from transistor 46 to rereference by DC shifting the voltage level of the feedback signal $V_{FB}$ produced at its emitter terminal to a voltage range where the low voltage level of the feedback signal $V_{FB}$ is lower than the lowest voltage of any acceptable input signal $V_{IN}$ and the high voltage level of the feedback $V_{FB}$ is higher than the most positive voltage level of any acceptable input signal $V_{IN}$. Structurally, the diode connected resistor 48 has its base terminal connected directly to the collector terminal whereupon both will receive the emitter signal from transistor 46. The emitter terminal of NPN-transistor 48 is connected to one end of an emitter resistor 50 which has its other end coupled to an emitter voltage $V_{E2}$. The emitter voltage $V_{E2}$ is a pulldown voltage which establishes current flow through the emitter resistor 50 for all signal conditions. The feedback signal $V_{FB}$ produced at the junction between the emitter of transistor 48 and one end of emitter resistor 50 tapped by a feedback line 52 is applied to the comparator and switching logic 14. Operationally, a decrease in the emitter current of transistor 46 causes a corresponding decrease in the emitter current of diode connected transistor 48 whereupon the voltage drop across emitter resistor 50 decreases causing a corresponding drop in the feedback voltage $V_{FB}$ to its low level. It should be noted that several diode connected transistors 48 could be used or that a Zener diode could be used for DC level shifting in other embodiments.

Since the feedback voltage $V_{FB}$ applied to the base terminal of transistor 28 in the comparator and switching logic 14 is at a lower level than the input signal $V_{IN}$ applied to the base terminal of transistor 26, these two transistors remain off, at least for the duration of the reset pulse $V_{RESET}$ received by transistor 16.

Between the times $t_1$ and $t_2$, where time $t_2$ can even occur partially coincident with the reset pulse depending upon the duration of time $t_0$–$t_1$ and time $t_2$–$t_3$, the reset pulse $V_{RESET}$ goes low to a voltage level more negative than the lowest acceptable input signal $V_{IN}$ voltage to turn off transistor 16 and the sample and hold pulse $V_{S/H}$ remains at its high level to turn on transistor 18 because the sample and hold signal $V_{S/H}$ now has a voltage level higher than the reset signal $V_{RESET}$, the reference signal $V_{REF}$, the input voltage $V_{IN}$, and the feedback signal $V_{FB}$. As a result, the level of the output signal $e_1$ from the comparator and switching logic 14 remains low whereupon the conducting states and signal levels of the remainder of the circuit, and the associated output signal $V_O$ and feedback signal $V_{FB}$ remain substantially the same, except for substantially insignificant transient variations.

If the combined three level reset, sample and hold signal $V_{RESET,\ S/H}$ is used and applied to the base terminal of transistor 16, for example, the transistor 18 could be removed from the comparator and switching logic 14 since one transistor 16 would control the operations of reset, sample and hold.

For the assumed signal condition of input voltage $V_{IN}$ greater than the reference voltage $V_{REF}$, at time $t_2$ the sample and hold pulse $V_{S/H}$ goes low to a voltage level more negative than the minimum input voltage $V_{IN}$. Thus, since the voltage of input signal $V_{IN}$ is greater than the voltages of any of the other input signals including the reset signal $V_{RESET}$, the sample and hold signal $V_{S/H}$, the reference voltage $V_{REF}$, and the reset feedback voltage $V_{FB}$, transistor 26 is turned on while transistors 16, 18, 20, and 28 are turned off. The resulting decrease in current flow through collector resistor 24 causes a decrease in the voltage drop thereacross and a corresponding increase in the output voltage level $e_1$ from the comparator and switching logic 14 during the time period during the times $t_2$ and $t_3$.

The voltage level of the output signal $V_O$ produced by the emitter follower buffer transistor 30 goes high in response to the high output level $e_1$ received at its base terminal from the comparator and switching logic 14. Operationally, as the voltage $e_1$ goes high, emitter follower buffer transistor 30 conducts more current causing an increase in the emitter current through the emitter follower resistor 32 thereby increasing the voltage drop thereacross. This increase in the voltage drop results in an increase in the voltage $e_o$ at the emitter terminal which is tapped by output line 34 to produce the output signal $V_O$ and which is applied to the feedback amplifier 36. This high output signal $V_O$ is indicative of a digital ONE corresponding to the condition of the input voltage $V_{IN}$ exceeding the reference voltage $V_{REF}$.

The feedback amplifier 36 is responsive to the level of output signal $e_o$ to produce a regenerative feedback signal $V_{FB}$ which has a high voltage level more positive than the maximum voltage level of any operationally acceptable input signal $V_{IN}$. Specifically, since the base bias voltage $V_B$ applied to the base terminal of transistor 42 has been selected to be at a voltage level more negative than the maximum voltage level of the emitter follower buffer output signal $e_o$ applied to the base terminal of transistor 38, transistor 42 is turned off and transistor 38 is turned on. As transistor 42 is turned off the collector current flow through collector resistor 44 decreases causing a decrease in the voltage drop thereacross and a corresponding increase in the collector terminal voltage.

This increased collector terminal voltage applied to the base terminal of emitter follower transistor 46 causes an increase in the emitter current that is fed to the diode connected transistor 48. This, in turn causes an increase in the emitter current of diode connected transistor 48 through the emitter resistor 50. This increase current flow through emitter resister 50 causes an increase in the voltage drop thereacross and a corresponding increase in the voltage developed at its junction with emitter terminal of transistor 48. As previously stated, since the emitter voltage $V_{e2}$ and the DC rereferencing level produced by the diode connected transistor 48 have been selected to place the maximum voltage of feedback signal $V_{FB}$ to a level greater than the maximum voltage of input signal $V_{IN}$, the feedback voltage $V_{FB}$ selectively turns on emitter coupled logic transistor 28 whereupon transistor 26 is turned off.

At the comparator and switching logic transistor 28 then becomes the dominant transistor since it has the most positive voltage signal applied to its base terminal thereby latching the sample and hold comparator 12 in its digital ONE state by the time $t_3$. The time duration for this latching operation between times $t_2$ and $t_3$ has been determined to be 1 to 2 nanoseconds for selected circuits. Of course, it should be understood that for lower signal levels the response speeds of the transistors would increase whereupon the time duration for the latching operation would decrease; and for higher signal levels less than the saturable levels of the transistors their operating speeds would be decreased to decrease the speed of operation of this circuit. Once the circuit is latched and held into its sampled state, variations in the input signal $V_{IN}$ will not thereafter affect the level of output signal $V_O$ since the feedback signal $V_{FB}$ is the most positive signal received by the comparator and switching logic 14 until the next subsequent reset pulse is received.

At time $t_0$ the next subsequent reset pulse $V_{RESET}$ is received by the sample and hold comparator 12 whereupon the output signal $V_O$ goes low to digital ZERO as the circuit is cleared for the next sampling operation. Specifically, since the high level of the reset pulse $V_{RESET}$ is more positive than any other input signal, including the high feedback signal $V_{FB}$, transistor 16 is turned on and dominates the circuit current flow while transistors 18, 20. 26, and 28 are turned off. Thereafter, the sample and hold comparator 12 returns to the circuit condition described previously for the time period between times $t_0$ and $t_1$. For example, the output signal $e_1$ from the comparator and switching logic goes low base biasing emitter follower buffer transistor 30 so that the emitter current decreases causing a decrease in the emitter voltage $e_o$ and the output voltage $V_O$. In addition, this emitter voltage $e_o$ applied to feedback amplifier 36 turns off transistor 38 while transistor 42 is turned on by the base bias voltage $V_B$ causing a decrease in the collector voltage. This decreased collector voltage applied to the base terminal of transistor 46 decreases its emitter current which is fed to the diode connected transistor 48 which in turn decrease its emitter current. This results in a decrease in the voltage level of the feedback signal $V_{FB}$ to a level more negative than the lowest acceptable input signal $V_{IN}$.

It should be noted that although a substantial hold period can occur between time $t_3$ and the next $t_0$, the sample and hold comparator 12 is capable of high sample rates.

Assuming a second input condition of the magnitude of the input voltage $V_{IN}$ being less than the magnitude of the reference voltage $V_{REF}$, the sample and hold comparator 12 is in the same reset operating condition between times $t_1$ and $t_2$ as previously described.

At time $t_2$ the sample and hold pulse goes from its dominant most positive voltage level to a low level more negative than the minimum input voltage $V_{IN}$. Consequently, the reference voltage $V_{REF}$ applied to the base terminal of transistor 20 becomes the most positive voltage signal received by the comparator and switching logic 14, whereupon transistor 20 conducts and transistors 16, 18, 26, and 28 are turned off. This causes the output signal $e_1$ from the comparator and switching logic to remain low.

The emitter follower buffer transistor 30 receives the low output $e_1$ from the comparator and switching logic 14 to maintain its low emitter current conduction level. Consequently, the output signal $V_O$ on output line 34 from the emitter terminal signal $e_o$ is low for a digital ZERO condition. In addition, the signal $e_o$ at the emitter terminal is applied to the feedback amplifier 36.

The feedback amplifier 36 is responsive to the output signal $e_o$ from the emitter follower buffer transistor 30 to maintain the low feedback signal $V_{FB}$. Specifically, since the signal applied to the base terminal of transistor 38 is lower than the base bias voltage $V_B$ applied to the base terminal of transistor 42, transistor 38 is turned off and transistor 42 is turned on thereby increasing current flow through the collector resistor 44. The resultant voltage drop across resistor 44 causes a decrease in the collector terminal voltage which is applied to the base terminal of an emitter follower transistor 46. This base bias causes a decrease in the emitter current in transistor 46 resulting in a corresponding decrease in the collector emitter current in diode connected transistor 48. The decrease current flow through emitter follower resistor 50 results in a decrease in the voltage level of the feedback signal $V_{FB}$ to a low voltage level less than the minimum voltage level of the input signal $V_{IN}$.

The comparator and switching logic 14 is responsive to the low feedback signal $V_{FB}$ and the remaining input signals so that the reference signal $V_{REF}$, between times $t_2$ and $t_3$, remains the most positive voltage signal received. Consequently, emitter coupled logic transistor 20 remains on while transistors 16, 18, 26, and 28 remain off. Thus, the circuit operating conditions remain the same and the output signal $V_O$ is low for a digital ZERO for the condition when the input signal $V_{IN}$ has a lower voltage level than the reference signal $V_{REF}$.

At time $t_3$ the sample and hold pulse $V_{S/H}$ goes more positive than the maximum input signal $V_{IN}$. As a result, the sample and hold pulse $V_{S/H}$ applied to the base terminal of emitter coupled logic transistor 18 turns it on whereas the lower level voltages applied to the base terminals of transistors 16, 20, 26, and 28 turn them off. Consequently, the output signal $e_1$ from the comparator switching logic 14 remains low.

The base of emitter follower buffer transistor 30 receives the signal $e_1$ and remains at its low conducting state. This low level of emitter current results in the lower voltage drop across emitter follower resistor 32 resulting in the low level emitter voltage $e_o$. This emitter voltage is fed on output line 34 as the low output signal $V_O$ representative of a ZERO.

Similarly, the operation of the feedback amplifier 36 remains the same with transistor 38 off and transistor 42 on. The low level collector voltage for transistor 42 base biases emitter follower transistor 46 so that it continues to conduct at its low level. Similarly, diode connected transistor 48 conducts at its low level so that the emitter current produces a low voltage drop across emitter follower resistor 50. Consequently, the feedback voltage $V_{FB}$ remains at its low level which is less than the minimum voltage level for any expected input signal $V_{IN}$.

The comparator and switching logic 14 receives the input signals such that the sample and hold pulse $V_{S/H}$ applied to the base terminal of emitter coupled logic transistor 18 which is now the most positive voltage signal input. Consequently, transistor 18 is turned on and transistor 20 is turned off. Transistors 16, 26, and 28 remain off. The operating condition of remainder of the sample and hold comparator 12 remains substantially the same and the level of output signal $e_1$ from the comparator and switching logic 14 remains the same. Thus, the level of the output signal $V_O$ from buffer transistor 30 remains at its low level digital ZERO. Thus, the sample and hold comparator circuit 12 is effectively latched in its hold state and will not be affected by voltage variation in the input signal $V_{IN}$ until the next high reset pulse $V_{RESET}$ is received.

Although the embodiment has been disclosed utilizing only one transistor type, it is feasible to construct other embodiments using a combination of active circuit types and that it is feasible to construct embodiment using PNP-transistors. Thus, while salient features have been illustrated and described with respect to a particular embodiment, it should be readily apparent that modifications can be made within the spirit and the scope of the invention.

What I claim is:

1. A sample and hold comparator comprising:

comparator logic means including a plurality of emitter coupled logic transistors, having a common output circuit, said transistors being selectively coupled to receive at their respective base terminals individual ones of a plurality of input voltages including an input voltage, a reference voltage, a reset voltage, a sample and hold voltage and a feedback voltage, amplifier means coupled to said common output circuit and operable when said sample and hold voltage is applied for producing an output voltage of a first level if said input voltage is less than said reference voltage, and an output voltage of a second level if said input voltage is greater than said reference voltage; and feedback amplifier means responsive to the level of said output voltage for regeneratively producing said feedback voltage which is operable to maintain said output voltage of said comparator logic means.

2. The sample and hold comparator of claim 1 in which said transistors are only operable in their active regions below saturation.

3. The sample and hold comparator of claim 2 in which all of said transistors are of the same transistor type.

4. The sample and hold comparator of claim 1 in which all of said transistors are NPN transistors.

5. The sample and hold comparator of claim 1 which all of said transistors are of the same transistor type.

6. The sample and hold comparator of claim 1 wherein said comparator logic means further includes an emitter coupled logic transistor coupled to receive at a base terminal a reset voltage which overrides the other applied voltages when the reset voltage is at a level that relatively exceeds the level of the other applied voltages to switch the output voltage of said comparator logic means to the first level during the time of the reset voltage, and a second emitter coupled logic transistor coupled to receive at a base terminal a sample and hold voltage which overrides the other applied voltages to switch the output voltage of said comparator logic means to the first level when the sample and hold voltage is at a level that relatively exceeds the level of the other applied voltages.

7. The sample and hold comparator of claim 6 in which two of said plurality of emitter coupled logic transistors of said comparator logic means are operably responsive to the sample and hold voltage so that the greatest relative magnitudes of the input voltage and the reference voltage to selectively turn on one of said emitter coupled logic transistors to produce an output voltage of the first level of the second level respectively.

8. The sample and hold comparator of claim 7 wherein one of said plurality of emitter coupled logic transistors of said comparator logic means is responsive to the feedback voltage such that the reference voltage and the sample and hold voltage are operable to produce the second level output voltage of said comparator logic means when the reference voltage is relatively greater than the input voltage and the input voltage and the feedback voltage are operable to produce the first level output voltage if the input voltage is relatively greater than the reference voltage.

9. The sample and hold comparator of claim 8 in which said comparator logic means includes a plurality of emitter coupled logic transistors coupled as a logical differential amplifier having a first circuit branch with a first, a second, and a third transistor each with their collector terminals and their emitter terminals respectively coupled in common, the base terminals of individual ones of said three transistors being coupled to receive the reset voltage, the sample and hold voltage, and the reference voltage, respectively, and a second circuit branch including a fourth and a fifth emitter coupled logic transistor having their emitter terminals and their collector terminals respectively coupled in common circuit relationship and their base terminals respectively coupled to receive the input voltage and the feedback voltage.

10. The sample and hold comparator of claim 9 in which said feedback amplifier includes a differential amplifier having a first transistor coupled to receive a voltage corresponding to the output voltage at a base terminal and a second transistor coupled to receive a base bias voltage at a base terminal such that said first transistor is turned on and said second transistor is tuned off when the received output voltage is at one of the first and second levels and said second transistor is turned on and said first transistor is turned off when the received output voltage is at the other of the said first level and second level, impedance means coupled to the collector terminal of one of said transistors in said differential amplifier to produce a voltage corresponding to the level of the received input signal, and transistor means coupled to receive the last said voltage to produce a regenerative feedback voltage of a first level having a minimum voltage level relatively greater than the maximum expected input voltage and of a second level having a voltage level relatively less than the maximum expected input voltage level, the first and the second levels of the feedback voltage corresponding to the levels of the output voltages.

11. The sample and hold comparator of claim 10 in which said transistor means coupled to receive the output signal of said feedback amplifier includes means for rereferencing the voltage level of the feedback voltage signal relative to the input voltage range.

12. The sample and hold comparator of claim 10 in which said transistor means coupled to receive the output voltage of said feedback amplifier to produce a feedback voltage includes diode connected transistor means for rereferencing the voltage level of the feedback voltage relative to the input voltage range.

13. The sample and hold comparator of claim 12 further including buffer means including an emitter follower transistor having a base terminal coupled to receive the output voltage of said comparator logic means and an emitter terminal coupled to an emitter follower resistor, and the output voltage being produced by the voltage drop across said emitter follower resistor.

14. The sample and hold comparator of claim 1 wherein two of said plurality of emitter coupled logic transistors of said comparator logic means are operably responsive to the sample and hold voltage so that the greatest relative magnitudes of the input voltage and the reference voltage to selectively turn on one of said emitter coupled logic transistors to produce an output voltage of the first level or the second level respectively.

15. The sample and hold comparator of claim 14 wherein one of said plurality of emitter coupled logic transistors of said comparator logic means is responsive to the feedback voltage such that the reference voltage and the sample and hold voltage is operable to produce the second level output voltage of said comparator logic means when the reference voltage is relatively greater than the input voltage and the input voltage and the feedback voltage are operable to produce the first level output voltage if the input voltage is relatively greater than the reference voltage.

16. The sample and hold comparator of claim 15 in which said feedback amplifier includes a differential amplifier having a first transistor coupled to receive a signal corresponding to the output voltage at a base terminal and a second transistor coupled to receive a base bias voltage at a base terminal such that said first transistor is turned on and said second transistor is turned off when the received output voltage is at one of the first and second levels and said second transistor is turned on and said first transistor is turned off when the received output voltage is at the other of the said first level and second level, impedance means coupled to the collector terminal of one of said transistors in said differential amplifier to produce a voltage corresponding to the level of the received input voltage, and transistor means coupled to receive the last said voltage to produce a regenerative feedback voltage of a first level having a minimum voltage level relatively greater than the maximum expected input voltage and of a second level having a voltage level relatively less than the minimum expected input voltage level, the first and the second levels of the feedback voltages corresponding to the levels of the output voltages.

17. The sample and hold comparator of claim 16 in which said transistor means coupled to receive the output voltage of said feedback amplifier includes means for rereferencing the voltage level of the feedback voltage relative to the input voltage range.

18. The sample and hold comparator of claim 16 in which said transistor means coupled to receive the output voltage of said feedback amplifier to produce a feedback voltage includes diode connected transistor means for rereferencing the voltage level of the feedback voltage relative to the input voltage range.

* * * * *